United States Patent Office 3,752,825
Patented Aug. 14, 1973

3,752,825
PHENYL-HETERYL-METHANE DYESTUFFS
Roderich Raue and Hans-Peter Kuhlthau, Leverkusen, Germany, assignors to Bayer Aktiengesellschaft, Leverkusen, Germany
No Drawing. Original application Apr. 15, 1968, Ser. No. 721,177. Divided and this application Sept. 25, 1970, Ser. No. 75,768
Claims priority, application Germany, Apr. 24, 1967, F 52,230
Int. Cl. C07d 27/38
U.S. Cl. 260—326.11                 3 Claims

ABSTRACT OF THE DISCLOSURE

This invention relates to phenyl-heteryl-methane dyestuffs having an indole nucleus, and the preparation thereof.

---

This is a division of application Ser. No. 721,177 filed Apr. 15, 1968.

The present invention relates to valuable new phenyl-heteryl-methane dyestuffs of the general formula

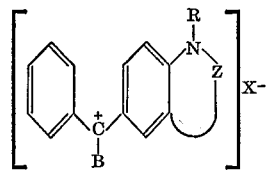

(I)

In this formula R denotes hydrogen, an alkyl, cycloalkyl or aralkyl radical and Z means the residual members of 5- or 6-membered ring which may contain a fused further six-membered carbocyclic ring; B stands for an aminoaryl radical of the general formula

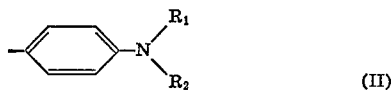

(II)

in which $R_1$ denotes hydrogen, an alkyl, aralkyl, cycloalkyl or aryl radical and $R_2$ means an alkyl, cycloalkyl or aralkyl radical, and in which alkyl radicals $R_1$ and $R_2$ may be fused to form a ring, possibly with the inclusion of further hetero atoms, or B stands for an indole radical of the general formula

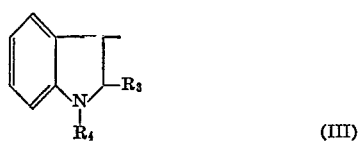

(III)

in which $R_3$ denotes hydrogen, an alkyl or aryl group, a carboxylic acid ester group, an optionally N-substituted carbonamide group or an alkoxy group, and $R_4$ means hydrogen, an alkyl, aralkyl, cycloalkyl or aryl radical; X stands for an anionic radical.

The new dyestuffs may contain further substituents with the exception of sulphonic acid and carboxylic acid groups (non-ionic substituents) in the aliphatic, araliphatic, cycloaliphatic and aromatic radicals, including those of the benzene rings illustrated by the formulae. Suitable non-ionic substituents are, for example: lower alkyl and alkoxy radicals with 1-4 carbon atoms, such as methyl, ethyl and substituted ethyl groups, e.g. chloroethyl or cyanoethyl; aralkyl, such as benzyl; aralkoxy, such as benzyloxy; aryl radicals, such as the phenyl radical and phenyl radicals substituted by non-ionic radicals, e.g. chlorophenyl, methylphenyl, ethylphenyl, nitrophenyl, methoxyphenyl, ethoxyphenyl, cyanophenyl etc.; aryloxy groups, such as phenyloxy; halogen substituents, especially chlorine and bromine; carboxylic acid ester groups, especially carboxylic acid methyl ester and ethyl ester groups: optionally N-substituted carbonamide groups, the preferred N-substituents being lower alkyl groups which may be further substituted, for example, by Cl, Br and OH, the cyano, nitro, hydroxyl or amino groups; further alkylsulphonyl, such as methylsulphonyl and ethylsulphonyl; arylsulphonyl, such as benzene-sulphonyl and p-toluene-sulphonyl; acyloxy groups, such as acetoxy and propionyloxy; acylamino groups, such as acetylamino, propionylamino, ethylsulphonylamino, benzoylamino, benzene-sulphonylamino etc.; and acyl radicals, such as the benzoyl and acetyl radicals.

A group of particularly valuable dyestuffs within the scope of the new products of the general Formula I corresponds to the general formula

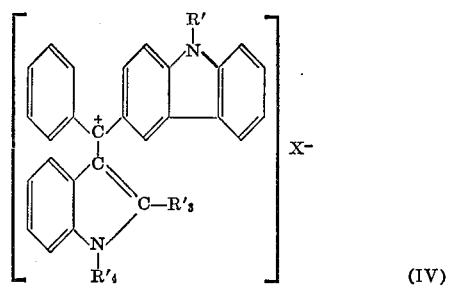

(IV)

In this formula R' stands for a lower alkyl radical, especially methyl or ethyl, $R'_3$ means methyl, phenyl or phenyl substituted by chlorine, bromine or lower alkyl or alkoxy radicals, and $R'_4$ stands for hydrogen or a lower alkyl radical, such as methyl, ethyl, or for benzyl; X denotes an anionic radical.

Another group of particularly valuable dyestuffs corresponds to the general formula

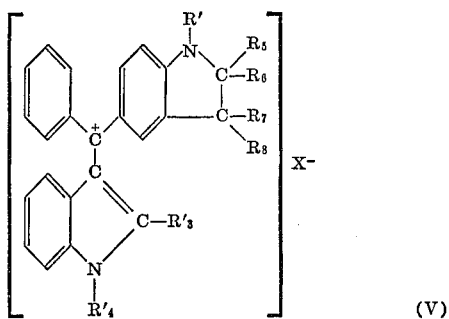

(V)

In this formula R', $R'_3$, $R'_4$ and X have the same meaning as in Formula IV, whilst the radicals $R_5$ to $R_8$ stand for hydrogen or lower alkyl radicals, and the radicals $R_6$ and $R_7$ may also be used to form a cycloalkylene ring.

The new dyestuffs are obtained by condensing benzoyl compounds of the general formula

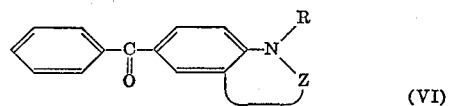

(VI)

in which R and Z have the same meaning as above, with aromatic amines of the formula

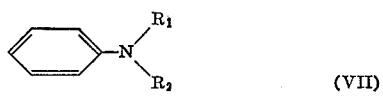

(VII)

or with indole derivatives of the formula

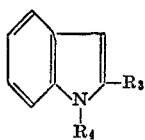

(VIII)

in the presence of acidic condensation agents to form dyestuffs of the Formula I, selecting starting components which are free from sulphonic acid and carboxylic acid groups.

The following benzoyl compounds (VI) are suited as starting material for the production of the dyestuffs according to the invention, for example:

9-benzoyl-9-methylcarbazole,
3-benzoyl-9-ethylcarbazole,
3-benzoyl-9-butylcarbazole,
3-benzoyl-9-cyanoethylcarbazole,
3-benzoyl-9-chloroethylcarbazole,
3-benzoyl-9-hydroxyethylcarbazole,
3-benzoyl-9-benzylcarbazole,
3-benzoyl-6-chloro-9-ethylcarbazole,
3-benzoyl-6-bromo-9-ethylcarbazole,
3-benzoyl-6-methyl-9-ethylcarbazole,
3-benzoyl-5-methoxy-9-methyl-carbazole,
3-(4'-methylbenzoyl)-9-ethylcarbazole,
3-(4'-methylbenzoyl)-5-methoxy-9-methylcarbazole,
3-(4'-methoxybenzoyl)-9-ethylcarbazole,
3-(4'-methoxybenzoyl)-5-methoxy-9-methylcarbazole,
3-(4'-chlorobenzoyl)-9-ethylcarbazole,
3-(2'-chlorobenzoyl)-9-ethylcarbazole,
3-(3'-chlorobenzoyl)-9-ethylcarbazole,
3-(2',5'-dichlorobenzoyl)-9-ethylcarbazole,
3-(2'-methylbenzoyl)-9-ethylcarbazole,
3-(3'-methylbenzoyl)-9-ethylcarbazole,
1,2,3,3-tetramethyl-5-benzoyl-dihydroindole,
1-ethyl-2,3,3-trimethyl-5-benzoyl-dihydroindole,
1,2,3,3-tetramethyl-5-benzoyl-7-methyl-dihydroindole,
1,2,3,3-tetramethyl-5-benzoyl-7-methoxy-dihydroindole,
1,2,3,3-tetramethyl-5-benzoyl-7-chloro-dihydroindole,
1,2,3,3-tetramethyl-5-(4'-methylbenzoyl)-dihydroindole,
1,2,3,3-tetramethyl-5-(2'-methylbenzoyl)-dihydroindole,
1,2,3,3-tetramethyl-5-(3'-methylbenzoyl)-dihydroindole,
1,2,3,3-tetramethyl-5-(4'-methoxybenzoyl)-dihydroindole,
1,2,3,3-tetramethyl-5-(2'-chlorobenzoyl)-dihydroindole,
1,2,3,3-tetramethyl-5-(3'-chlorobenzoyl)-dihydroindole,
1,2,3,3-tetramethyl-5-(4'-chlorobenzoyl)-dihydroindole,
1,2,3,3-tetramethyl-5-(2',5'-dichlorobenzoyl)-dihydroindole,
1,2-dimethyl-5-benzoyl-2,3-dihydroindole,
1-methyl-2-phenyl-5-benzoyl-2,3-dihydroindole,
1-ethyl-2-phenyl-5-benzoyl-2,3-dihydroindole,
1-methyl-2-phenyl-5-(2'-chlorobenzoyl)-2,3-dihydroindole,
1-methyl-6-benzoyl-1,2,3,4-tetrahydroquinoline,
1-methyl-6-(2'-chlorobenzoyl)-1,2,3,4-tetrahydroquinoline,
1-ethyl-6-(4'-chlorobenzoyl)-1,2,3,4-tetrahydroquinoline,
1-methyl-6-(4'-methylbenzoyl)-1,2,3,4-tetrahydroquinoline,
1-methyl-6-(4'-methoxybenzoyl)-1,2,3,4-tetrahydroquinoline,
6-benzoyl-9-methyl-1,2,3,4,10,11-hexahydrocarbazole,
6-(2'-chlorobenzoyl)-9-methyl-1,2,3,4,10,11-hexahydrocarbazole.

Suitable aromatic amines of the general Formula VII are, for example:

N,N-dimethylaniline,
N,N-diethylaniline,
N,N-dibutylaniline,
N-methyl-N-hydroxyethylaniline,
N,N-dihydroxyethylaniline,
N-methyl-N-chloroethylaniline,
N,N-dichloroethylaniline,
1-N-ethyl-N-hydroxyethylamino-3-methylbenzene,
1-N-ethyl-N-chloroethylamino-3-methylbenzene,
N-butyl-N-hydroxyethylaniline,
3-chloro-N,N-diethylaniline,
3-chloro-1-N,N-dibutylaniline,
3-chloro-1-N,N-dimethylaniline,
N-methyl-N-benzylaniline,
N-ethyl-N-benzylaniline,
1-N-ethyl-N-benzylamino-3-methylbenzene,
N-methyl-diphenylamine,
N-ethyldiphenylamine,
N-cyanoethyl-diphenylamine,
N-(4-ethoxyphenyl)-N-methylaniline,
N-(4-methylphenyl)-N-methylaniline,
N-(2-ethoxyphenyl)-N-methylaniline,
3-methoxy-1-N,N-dimethylaniline and
3-ethoxy-1-N,N-diethylaniline.

Suitable indole derivatives of the general Formula VIII are, for example:

2-methylindole,
2-phenylindole,
2,5-dimethylindole,
2-methyl-5-chloroindole,
2-phenyl-5-methylindole,
2-phenyl-5-chloroindole,
1,2-dimethylindole,
1-methyl-2-phenylindole,
1,2,5-trimethylindole,
1,5-dimethyl-2-phenylindole,
1,2-dimethyl-5-chloroindole,
1-methyl-2-phenyl-5-chloroindole,
1-ethyl-2-methylindole,
1-ethyl-2-phenylindole,
1-ethyl-2,5-dimethylindole,
1-ethyl-2-phenyl-5-methylindole,
1-ethyl-2-methyl-5-chloroindole,
1-ethyl-2-phenyl-5-chloroindole,
1-benzyl-2-methylindole,
1,4,7-trimethyl-2-phenylindole,
1-n-butyl-2-phenylindole,
1-isobutyl-2-(4'-chlorophenyl)-4,6-dimethylindole,
1-cyanoethyl-2-methylindole,
1-cyanoethyl-2-phenylindole.

Suitable acidic condensation agents are, for example: phosphorus oxychloride, thionyl chloride, phosgene, zinc chloride, aluminium chloride, tin tetrachloride, antimony pentachloride.

The reaction can be carried out in the presence or absence of an inert solvent. Suitable solvents are, for example, chlorobenzene, o-dichlorobenzene, toluene, xylene, benzene, ligroin, dioxan, cyclohexane, carbon tetrachloride, trichloroethylene and chloroform.

The reaction is generally carried out at an elevated temperature, for example, at 40–160° C., preferably at 70–120° C.

The anionic radicals $X^-$ may be inorganic as well as organic ions; examples are: $Cl^-$, $Br^-$, $CH_3SO_4^-$, p-toluene-sulphonate, $HSO_4^-$, benzene-sulphonate, p-chlorobenzene-sulphonate, phosphate, acetate, formate, propionate, oxalate, lactate, maleinate, crotonate, tartrate, citrate, $NO_3^-$, perchlorate, $ZnCl_3^-$.

The type of the anionic radicals is of no importance for the properties of the dyestuffs, provided they are substantially colourless radical and do not impair the solubility of the dyestuffs in an undesirable manner.

According to a further process, part of the dyestuffs according to the invention can also be obtained by condensation of amino-benzophenones of the general formula

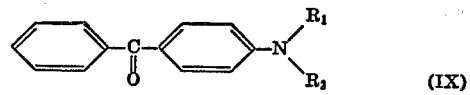

(IX)

with compounds of the general formula

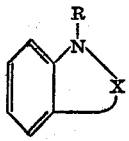

(X)

in which R, $R_1$, $R_2$ and Z have thhe same meaning as above, in the presence of acidic condensation agents.

Suitable aminobenzophenones of the general Formula IX are, for example:

4-N,N-dimethylaminobenzophenone,
4-N,N-diethylaminobenzophenone,
4-N,N-dibutylaminobenzophenone,
4-N-methyl-N-hydroxyethylaminobenzophenone,
4-N-methyl-N-chloroethylaminobenzophenone,
4-N-methyl-N-cyanoethylaminobenzophenone,
4-N-ethyl-N-chloroethylaminobenzophenone,
4-N-ethyl-N-hydroxyethylaminobenzophenone,
4-N-butyl-N-hydroxyethylaminobenzophenone,
4-N-butyl-N-chloroethylaminobenzophenone,
4-N,N-dihydroxyethylaminobenzophenone,
4-N,N-dichloroethylaminobenzophenone,
4-N-methyl-N-benzylaminobenzophenone,
4-N-ethyl-N-benzylaminobenzophenone,
4-N-phenyl-N-methylaminobenzophenone,
4-N-(4'-ethoxyphenyl)-N-methylaminobenzophenone,
4-N-(2'-ethoxyphenyl)-N-methylaminobenzophenone,
4-N-(4'-methylphenyl)-N-methylaminobenzophenone,
2-methyl-4-diethylaminobenzophenone,
2-chloro-4-N,N-diethylaminobenzophenone,
2-methyl-4-N-hydroxyethyl-N-ethylaminobenzophenone,
2-chloro-4'-N,N-dimethylaminobenzophenone,
2-bromo-4'-N,N-diethylaminobenzophenone,
3-chloro-4'-N,N-diethylaminobenzophenone,
4-ethyl-4'-N,N-diethylaminobenzophenone,
4-cyano-4'-N,N-diethylaminobenzophenone,
2-chloro-4'-N-phenyl-N-methylaminobenzophenone,
2-chloro-4'-N-(4''-ethoxyphenyl)-N-methylaminobenzophenone,
3-chloro-4'-N-phenyl-N-methylaminobenzophenone,
4-phenyl-4'-N-phenyl-N-methylaminobenzophenone,
4-ethyl-4'-N-phenyl-N-methylaminobenzophenone,
4-methyl-4'-N-(4'''-ethoxyphenyl)-N-methylaminobenzophenone,
4-methyl-4'-N,N-dimethylaminobenzophenone,
4-methyl-4'-N-phenyl-N-methylaminobenzophenone,
4-cyano-4'-N,N-dimethylaminobenzophenone,
4-carbomethoxy-4'-N,N-dimethylaminobenzophenone,
4-methylsulphonyl-4'-N-phenyl-N-methylaminobenzophenone.

Suitable compounds of the general Formula X are, for example:

9-methylcarbazole,
9-ethylcarbazole,
9-butylcarbazole,
9-cyanoethylcarbazole,
9-chloroethylcarbazole,
9-hydroxyethylcarbazole,
9-benzylcarbazole,
3-chloro-9-ethylcarbazole,
3-bromo-9-ethylcarbazole,
2-methoxy-9-methylcarbazole,
3-methyl-9-ethylcarbazole,
1,2,3,3-tetramethyl-2,3-dihydroindole,
1-ethyl-2,3,3-trimethyl-2,3-dihydroindole,
1,2,3,3-tetramethyl-7-methoxy-2,3-dihydroindole,
1,2,3,3,7-pentamethyl-2,3-dihydroindole,
1,2,3,3-tetramethyl-7-chloro-2,3-dihydroindole,
1,2-dimethyl-2,3-dihydroindole,
1-methyl-2-phenyl-2,3-dihydroindole,
1-ethyl-2-phenyl-2,3-dihydroindole,
1-methyl-1,2,3,4-tetrahydroquinoline,
1-ethyl-1,2,3,4-tetrahydroquinoline,
9-methyl-1,2,3,4,10,11-hexahydrocarbazole.

Part of the dyestuffs according to the invention can also be obtained by condensation of benzoyl-indoles of the general formula

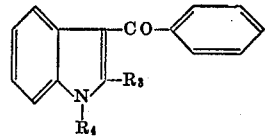

(XI)

wherein $R_3$ and $R_4$ have the same meaning as above, with compounds of the general Formula X in the presence of acidic condensation agents.

Benzoyl-indoles of the general Formula XI suitable for the production of the dyestuffs according to the invention are, for example:

1-methyl-2-phenyl-3-benzoylindole,
1,2-dimethyl-3-benzoylindole,
1,2,5-trimethyl-3-benzoylindole,
1,5-dimethyl-2-phenyl-3-benzoylindole,
1,2-dimethyl-3-benzoyl-5-chloroindole,
1-methyl-2-phenyl-3-benzoyl-5-chloroindole,
1-ethyl-2-phenyl-3-benzoylindole,
1-ethyl-2-methyl-3-benzoylindole,
1-benzyl-2-methyl-3-benzoylindole,
1,4,7-trimethyl-2-phenyl-3-benzoylindole,
1-n-butyl-2-phenyl-3-benzoylindole,
1-cyanoethyl-2-methyl-3-benzoylindole,
1-cyanoethyl-2-phenyl-3-benzoylindole,
1-methyl-2-(2'-chlorophenyl)-3-benzoylindole,
1-methyl-2-phenyl-3-(2'-chlorobenzoyl)-indole,
1-methyl-2-phenyl-3-(3'-chlorobenzoyl)-indole,
1-methyl-2-phenyl-3-(4'-methylbenzoyl)-indole,
1,2-dimethyl-3-(2'-chlorobenzoyl)-indole,
1,2-dimethyl-3-(3'-chlorobenzoyl)-indole,
1,2-dimethyl-3-(4'-methylbenzoyl)-indole,
1-ethyl-2-phenyl-3-(2'-chlorobenzoyl)-indole.

Another suitable process for the production of the new dyestuffs consists in that benzanilides of the formula

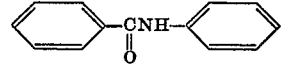

(XII)

are reacted with heterocyclic compounds of the general Formula X in the presence of acidic condensation agents and the intermediate product is subsequently condensed, without being isolated, with aromatic amines of the general Formula VII or with indoles of the general Formula VIII.

Examplesof benzanilides (XII) which are suitable for this process, are: benzanilide, 2-chlorobenzanilide, 3-chlorobenzanilide, 4-chlorobenzanilide, 2-methylbenzanilide, 3-methylbenzanilide, 4-methylbenzanilide, 2-methoxybenzanilide, 2-ethoxybenzanilide, 2,4-dimethylbenzanilide, 2,5-dichlorobenzanilide, 2,6-dichlorobenzanilide.

Suitable aromatic amines (VII), indoles of the Formula VIII and heterocyclic compounds of the Formula X are the same compounds which have already been mentioned for the preceding methods.

Suitable acidic condensation agents are, in this case, phosphorus oxychloride, thionyl chloride, phosgene, zinc chloride, aluminium chloride and the like.

The products which can be obtained according to the present process are valuable dyestuffs which can be used for the dyeing and printing of materials of leather, tannin-treated cotton, cellulose acetate, synthetic superpolyamides and -polyurethanes, and for the dyeing of fibres containing lignin, such as coco, jute and sisal. They are further suitable for the production of writing liquids, stamp dyes, pastes for ball opint pens, and they can also be used in offset printing.

Above all, they are well suited for the dyeing and printing of materials consisting completely or in part of polymers or copolymers of acrylonitrile or vinylidene cyanide or consisting of acid-modified polyester materials, such as polyethylene glycol terephthalates which contain sulphonic acid groups (type Dacron 64, manufactured by du Pont de Nemours and Company), as are described, for example, in Belgian patent specification No. 549,179 and U.S. patent specification No. 2,893,816, and they are characterised on these materials by a very good fastness to light, wet processing, rubbing and sublimation. They also have a very good affinity to these fibres and good fastness to cross-dyeing. With anionic precipitating agents, such as alumina, tannin, phosphotungstic (molybdic) acids, the dyestuffs form pigments which are fast to light and can be used with advantage for paper printing.

EXAMPLE 1

43.9 parts by weight 3-(2'-chlorobenzoyl)-9-ethylcarbazole are mixed, while stirring, with 40 parts by weight phosphorus oxychloride and subsequently with 27.3 parts by weight 1-methyl-2-phenylindole. The reaction mixture is then heated to 100° C. and kept at this temperature for 3 hours.

The melt is added, while still warm, to 800 parts by volume of warm water at 50° C. and the mixture is stirred overnight.

The dyestuff resin so obtained is separated and dissolved in 3000 parts by volume of 10% acetic acid at boiling temperature. The solution is clarified with active charcoal and when the solution has somewhat cooled down, the dyestuff is precipitated by the addition of 60 parts by volume of a solution of zinc chloride in the same amount by weight of water. The dyestuff is stirred for some time, filtered off with suction and washed with a 5% sodium chloride solution. The dyestuff so obtained corresponds to the formula

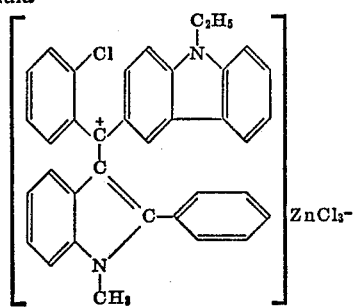

and dyes fibres of polyacrylonitrile in a greenish blue shade fast to light.

If the reaction is carried out with the benzoylcarbazoles and indole derivatives listed in the following table according to the process described above, dyestuffs are also obtained which are characterised by very good dyeing properties and dye polyacrylonitrile fibres in the specified shades.

| Benzoyl-carbazole | Indole | Shade on polyacrylonitrile |
|---|---|---|
| 3-(2'-chlorobenzoyl)-9-ethylcarbazole. | 1,2-dimethylindole | Violet. |
| Do | 2-methylindole | Reddish violet. |
| 3-benzoyl-9-ethylcarbazole. | 1,2-dimethylindole | Violet. |
| Do | 2-methylindole | Red-violet. |
| Do | 1-methyl-2-phenylindole. | Grey-green. |
| Do | 1-ethyl-2-phenylindole. | Blue-grey. |
| Do | 1,5-dimethyl-2-phenylindole. | Do. |
| Do | 2-phenylindole | Grey-green. |
| 3-(4'-chlorobenzoyl)-9-ethylcarbazole. | 1,2-dimethylindole | Bluish violet. |
| Do | 2-methylindole | Do. |
| Do | 1-methyl-2-phenylindole. | Blue-green. |
| Do | 1-ethyl-2-phenylindole. | Do. |
| Do | 1,5-dimethyl-2-phenylindole. | Blue-grey. |

| Benzoyl-carbazole | Indole | Shade on polyacrylonitrile |
|---|---|---|
| 3-(4'-methylbenzoyl)-9-ethylcarbazole. | 1,2-dimethylindole | Bordeaux. |
| Do | 2-methylindole | Do. |
| Do | 1-methyl-2-phenylindole. | Bluish grey. |
| Do | 1,5-dimethyl-2-phenylindole. | Do. |
| 3-(4'-methoxybenzoyl)-9-ethylcarbazole. | 1,2-dimethylindole | Bluish red. |
| Do | 2-methylindole | Do. |
| Do | 1-methyl-2-phenylindole. | Bluish Bordeaux. |
| 3-benzoyl-5-methoxy-9-methylcarbazole. | 1,2-dimethylindole | Red-violet. |
| Do | 2-methylindole | Bluish Bordeaux. |
| Do | 1-methyl-2-phenylindole. | Grey-green. |
| Do | 1,5-dimethyl-2-phenylindole. | Blue-grey. |
| 3-(4'-methoxybenzoyl)-5-methoxy-9-methylcarbazole. | 1-methyl-2-phenylindole. | Currant grey. |
| Do | 2-methylindole | Reddish Bordeaux. |
| Do | 1,2-dimethylindole | Do. |
| Do | 1-ethyl-2-phenylindole. | Currant grey. |
| 3-(4'-methylbenzoyl)-5-methoxy-9-methylcarbazole. | 2-methylindole | Bordeaux. |
| Do | 1,2-dimethylindole | Bluish Bordeaux. |
| Do | 1-methyl-2-phenylindole. | Greenish grey. |
| Do | 1-ethyl-2-phenylindole. | Do. |

EXAMPLE 2

10 parts by weight 4-dimethylamino-4'-methoxy-benzophenone, 7.7 parts by weight 9-ethyl-carbazole and 15 parts by weight phosphorus oxychloride are stirred at 100° C. for 3 hours.

The hot melt is stirred into 500 parts by volume of water, and the water is decanted from the dyestuff resin after 2 hours.

The residue is dissolved in 100 parts by volume of glacial acetic acid, and 400 parts by volume of boiling water are then added with stirring.

The solution is clarified with active charcoal and the dyestuff precipitated in the form of violet bronzy crystals by the addition of 20 parts by weight of 20% hydrochloric acid and 20 parts by weight zinc chloride. The dyestuff so obtained corresponds to the formula

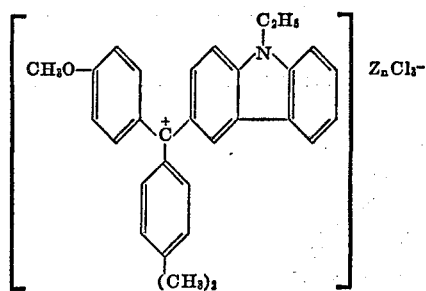

and dyes fibres of polyacrylonitrile in a current-blue shade fast to light.

If the reaction is carried out with the amino benzophenones and carbazole derivatives listed in the following table according to the process described above, dyestuffs are also obtained which are characterised by very good dyeing properties and dye polyacrylonitrile fibres in the specified shades.

| Amino-benzophenone | Carbazole | Shade on polyacrylonitrile |
|---|---|---|
| 4-diethylaminobenzophenone. | 9-ethylcarbazole | Reddish dark blue. |
| 4-dimethylaminobenzophenone. | .....do..... | Do. |
| 4-dimethylamino-4'-methylbenzophenone. | .....do..... | Currant grey. |
| 4-dimethylamino-3'-chlorobenzophenone. | .....do..... | Blue-grey. |
| 4-dimethylamino-2'-chlorobenzophenone. | .....do..... | Blue-grey. |
| 4-diethylamino-4'-methylbenzophenone. | .....do..... | Currant grey. |
| 4-phenylmethylaminobenzophenone. | 2-methoxy-9-methylcarbazole. | Bluish green. |

EXAMPLE 3

10 parts by weight 1,2,3,3-tetramethyl-5-benzoyldihydro-2,3-indole, 7.4 parts by weight 1-methyl-2-phenylindole and 15 parts by weight phosphorus oxychloride are heated together to 100° C. and stirred at this temperature for 3 hours. The hot melt is poured into 1000 parts by volume of water and stirred for 3 hours.

The dyestuff resin is then separated, dissolved in 1000 parts by volume of boiling water, the solution is clarified with active charcoal, and the dyestuff is salted out by the addition of 50 parts by weight sodium chloride, After filtering off with such suction and drying, the dyestuff forms violet bronzy crystals. It corresponds to the formula

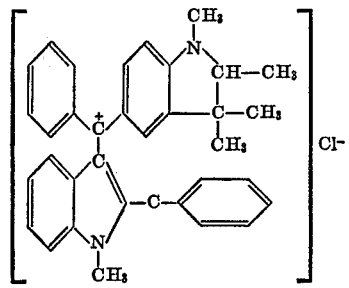

and dyes fibres of polyacrylonitrile in a voilettish blue shade.

If this reaction is carried out with the dihydro-2,3-indoles and indole derivatives listed in the following table according to the process described above, dyestuffs are also obtained which are characterised by very good fastness properties.

| Benzoyl-dihydroindole | Indole | Shade on polyacrylonitrile fibres |
|---|---|---|
| 1,2,3,3-tetramethyl-5-benzoyl-2,3-dihydroindole. | 1,2-dimethylindole | Violet. |
| 1,2,3,3-tetramethyl-5-(2'-chlorobenzoyl)-2,3-dihydroindole. | .....do..... | Bluish violet. |
| Do | 1-methyl-2-phenylindole | Blue. |

EXAMPLE 4

Polyacrylonitrile fibres are introduced at 40° C. in a liquor ratio of 1:40 into an aqueous bath containing, per litre, 0.75 g. of 30% acetic acid, 0.38 g. sodium acetate and 0.3 g. of the phenyl-carbazolyl-indolyl-methane dyestuff described and illustrated by the formula in Example 1. The bath is heated to boiling temperature within 20–30 minutes and kept at this temperature for 30–60 minutes. The polyacrylonitrile fibres are subsequently rinsed and dried. A greenish blue dyeing is obtained which is characterised by very good fastness to light and very good fastness to wet processing.

EXAMPLE 5

East Indian bastard leather which has been prepared for dyeing in the usual manner is dyed in a liquor ratio of 1:10 with 1% of the dyestuff described in Example 1 and previously pasted with the same amount of 30% acetic acid, in a drum at 40° C. for 45 minutes. The leather is finished in known manner. A greenish blue dyeing of good fastness properties is obtained.

EXAMPLE 6

Acid-modified polyglycol terephthalate fibres of the type Dacron 64 (Du Pont) or as are described in Belgian patent specification No. 549,179 and in U.S. patent specification No. 2,893,816 are introduced at 20° C. in a liquor ratio of 1:40 into an aqueous bath which contains, per litre, 3 g. sodium sulphate, 0.5–2 g. of an oleyl polyglycol ether (50 moles ethylene oxide), 2.5–5 g. diphenyl and 0.3 g. of the dyestuff corresponding to the formula of Example 1, and which has been adjusted to a pH value of 4.5–5.5 by means of acetic acid. The bath is heated to 98° C. within 30 minutes and kept at this temperature for 60 minutes. The fibres are subsequently rinsed and dried. A greenish blue dyeing of very good fastness properties is obtained.

EXAMPLE 7

Acid-modified polyglycol terephthalate fibres, such as in Example 6, are introduced at 20° C. in a liquor ratio of 1:40 into an aqueous bath which contains, per litre, 6–10 g. sodium sulphate, 0.5–1 g. oleyl polyglycol ether (50 moles ethylene oxide), 0–15 g. dimethylbenzyl-dodecyl-ammonium chloride and 0.3 g. of the dyestuff corresponding to the formula of Example 1, and which has been adjusted to pH 4–5 by means of acetic acid. The bath is heated to 120° C. within 30 minutes and kept at this temperature for 60 minutes. The fibres are subsequently rinsed and dried. A greenish blue dyeing of very good fastness properties is obtained.

We claim:
1. A dyestuff of the formula

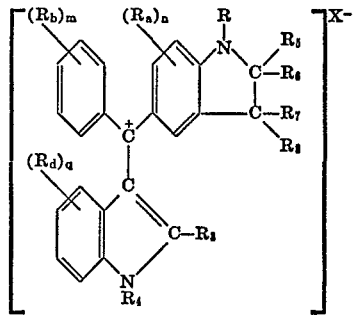

R stands for lower alkyl,
$R_3$ stands for methyl, phenyl, or phenyl substituted by a member selected from the group consisting of chlorine, bromine, lower alkyl, and lower alkoxy,
$R_4$ stands for H, lower alkyl, benzyl, or cyanoethyl,
$R_5$–$R_8$ stands for H, lower alkyl, or phenyl,
$R_a$ is Cl, $CH_3$, or $OCH_3$ and $n$ is 0 or 1,
$R_b$ is Cl, $CH_3$, $OCH_3$, or $OC_2H_5$, and $m$ is 0, 1 or 2,
$R_d$ is Cl, or $CH_3$ and $q$ is 0, 1 or 2, and
X stands for an anionic radical.

2. Dyestuff of claim 1 of the formula

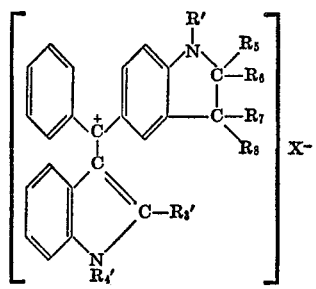

wherein
$R'$ is lower alkyl;
$R_3'$ is methyl, phenyl, or phenyl substituted by a member selected from the group consisting of chlorine, bromine, lower alkyl, and lower alkoxy;
$R_4'$ is H, lower alkyl, or benzyl;
$R_5$, $R_6$, $R_7$ and $R_8$ are H or lower alkyl.

3. The dyestuff of claim 1 of the formula
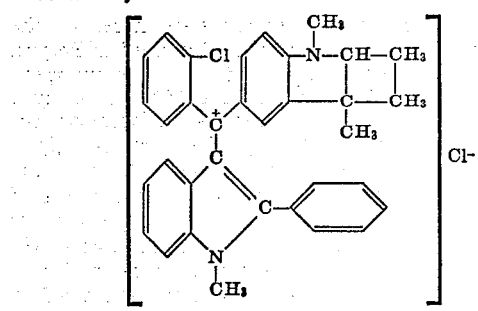
References Cited
UNITED STATES PATENTS
3,514,453   5/1970   Spatz et al. _____ 260—240
JOSEPH A. NARCAVAGE, Primary Examiner
U.S. Cl. X.R.
260—288 R, 315, 326.15

UNITED STATES PATENT OFFICE
CERTIFICATE OF CORRECTION

Patent No. 3,752,825    Dated August 14, 1973

Inventor(s) Roderich Raue et al

It is certified that error appears in the above-identified patent and that said Letters Patent are hereby corrected as shown below:

Column 2, line 57, "used" should be ---fused---.

Column 3, line 15, "9-benzoyl-" should be --- 3-benzoyl ---.

Column 6, line 74, "opint" should be ---point---.

Column 8, line 63, " $(CH_3)_2$ " should be ---$N(CH_3)_2$---.

Column 11, lines 3-5 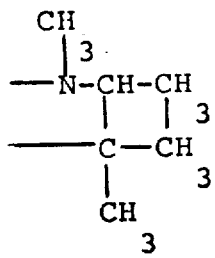

should be

--- 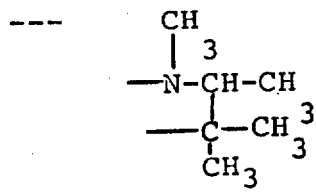

Signed and sealed this 8th day of April 1975.

(SEAL)
Attest:

RUTH C. MASON
Attesting Officer

C. MARSHALL DANN
Commissioner of Patents
and Trademarks